US011541993B2

(12) United States Patent
Rouiller et al.

(10) Patent No.: US 11,541,993 B2
(45) Date of Patent: Jan. 3, 2023

(54) TOOL FOR ASSISTING WITH THE ADJUSTMENT OF A MANEUVERING MECHANISM OF A MAIN LANDING GEAR

(71) Applicant: Airbus Operations SAS, Toulouse (FR)

(72) Inventors: Antoine Rouiller, Toulouse (FR); Jérémy Bonjean, Toulouse (FR); Alain Segart, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 23 days.

(21) Appl. No.: 17/190,595

(22) Filed: Mar. 3, 2021

(65) Prior Publication Data

US 2021/0276699 A1    Sep. 9, 2021

(30) Foreign Application Priority Data

Mar. 5, 2020 (FR) ...................................... 2002206

(51) Int. Cl.
*B64C 25/28* (2006.01)
(52) U.S. Cl.
CPC .................. *B64C 25/28* (2013.01)
(58) Field of Classification Search
CPC .. G01B 5/255; G01B 5/14; G01C 3/00; B64C 25/00; B64C 25/10; B64C 25/18; B64C 25/268; B64C 25/26; B64C 2025/125
See application file for complete search history.

(56) References Cited

U.S. PATENT DOCUMENTS

| 2,156,012 | A * | 4/1939 | Doyle | B64C 25/28 340/960 |
| 7,089,150 | B2 * | 8/2006 | Phillips, III | G01B 11/275 702/154 |
| 7,856,293 | B2 * | 12/2010 | Furgal | G01C 21/16 701/31.4 |
| 2006/0064275 | A1 * | 3/2006 | Phillips, III | G01B 11/275 702/154 |
| 2007/0260365 | A1 | 11/2007 | Furgal | |
| 2012/0217341 | A1 | 8/2012 | Bennett | |
| 2016/0018209 | A1 * | 1/2016 | Nagornov | G01B 7/315 33/301 |
| 2017/0350684 | A1 * | 12/2017 | Maliszewski | G01B 5/0025 |
| 2019/0002120 | A1 | 1/2019 | Vinson et al. | |
| 2019/0152589 | A1 * | 5/2019 | Evans | B64C 13/42 |

FOREIGN PATENT DOCUMENTS

| EP | 3394837 B1 | 2/2020 |
| FR | 2875900 A1 | 3/2006 |
| GB | 2472988 A | 3/2011 |

OTHER PUBLICATIONS

French Search Report; priority document.

* cited by examiner

*Primary Examiner* — Justin M Benedik
(74) *Attorney, Agent, or Firm* — Greer, Burns & Crain, Ltd.

(57) ABSTRACT

An adjustment tool for adjusting a maneuvering mechanism of a main landing gear of an aircraft, the landing gear having a plurality of wheels. The tool includes a telemeter, a locking system for locking the telemeter on the external face of a wheel, a wireless communication unit that is connected to the telemeter and makes it possible, when the tool is being used, to connect the telemeter with a control device provided with a display screen.

1 Claim, 3 Drawing Sheets

TOOL FOR ASSISTING WITH THE ADJUSTMENT OF A MANEUVERING MECHANISM OF A MAIN LANDING GEAR

CROSS-REFERENCES TO RELATED APPLICATIONS

This application claims the benefit of the French patent application No. 2002206 filed on Mar. 5, 2020, the entire disclosures of which are incorporated herein by way of reference.

FIELD OF THE INVENTION

The present invention relates to a tool for assisting with the adjustment of a maneuvering mechanism of a retractable main landing gear of an aircraft, and to a method for adjusting a retractable main landing gear of an aircraft that is implemented by means of such a tool.

BACKGROUND OF THE INVENTION

With reference to FIG. 1, a main landing gear 1 of an aircraft comprises a landing gear strut 2 that is fastened inside a landing gear bay 3 of the aircraft and mounted so as to be able to pivot on the aircraft about a pivot axis that is parallel to the longitudinal axis X of the fuselage of the aircraft, a bogie rocker arm 4 that is fastened to the end of the landing gear strut 2 and extends parallel to the longitudinal axis X, and axles 5 that are mounted on the bogie rocker arm 4 and on which are mounted wheels 6 that are all identical. The landing gear 1 also comprises a maneuvering mechanism 7, for example with actuators, for moving the landing gear between an extended position in which the landing gear strut 2 is substantially perpendicular to the longitudinal axis X of the aircraft, and a retracted position in which the landing gear 1 is entirely folded into the bay 3. In the extended and retracted positions, doors 8 close the landing gear bay 3 in order to reduce the drag that affects the aircraft.

The maneuvering mechanism 7 has to be adjusted so as to leave a space E between the doors 8 and the main landing gear 1 that is sufficient for the doors 8 to be able to be closed without the risk of contact with the main landing gear 1 after the latter has reached its retracted position.

In order to carry out the adjustments, the aircraft is mounted on props and the maneuvering mechanism 7 is activated so as to move the main landing gear 1 from its extended position to its retracted position. An operator positioned in the landing gear bay 3 measures the distance D between the top wall 3d (substantially horizontal surface) of the landing gear bay 3 and the main landing gear 1.

The operators adjust the maneuvering mechanism 7 so that, in the retracted position, the distance D between the top wall 3d (substantially horizontal surface) of the landing gear bay 3 and the main landing gear 1 is smaller than a predetermined value.

SUMMARY OF THE INVENTION

The invention aims to meet all or part of the abovementioned requirement. To that end, an adjustment tool for adjusting a maneuvering mechanism of a main landing gear of an aircraft is proposed, the landing gear having a plurality of wheels, the tool comprising a telemeter, a locking system for locking the telemeter on the external face of a wheel, a wireless communication unit that is connected to the telemeter and makes it possible, when the tool is being used, to connect the telemeter with a control device provided with a display screen.

The tool thus makes it possible to adjust the maneuvering mechanism of the main landing gear without an operator having to be positioned in the landing gear bay.

BRIEF DESCRIPTION OF THE DRAWINGS

The abovementioned features of the invention, along with others, will become more clearly apparent upon reading the following description of an exemplary embodiment, said description being given with reference to the appended drawings, in which.

DETAILED DESCRIPTION OF THE PREFERRED EMBODIMENTS

Figure 1:
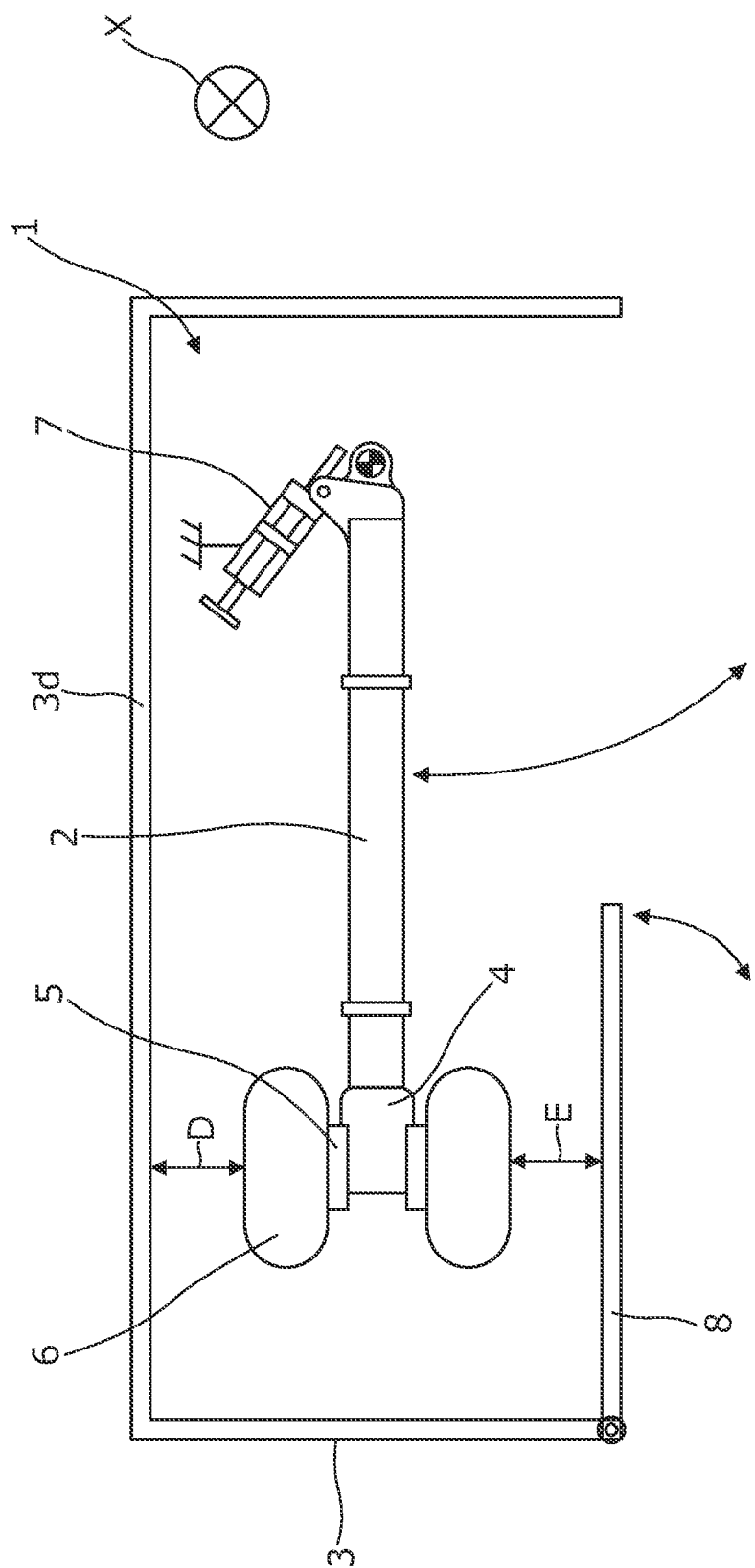
FIG. 1 is a schematic view of a landing gear bay of an aircraft, in which is arranged a main landing gear in the retracted position.
Figure 2:
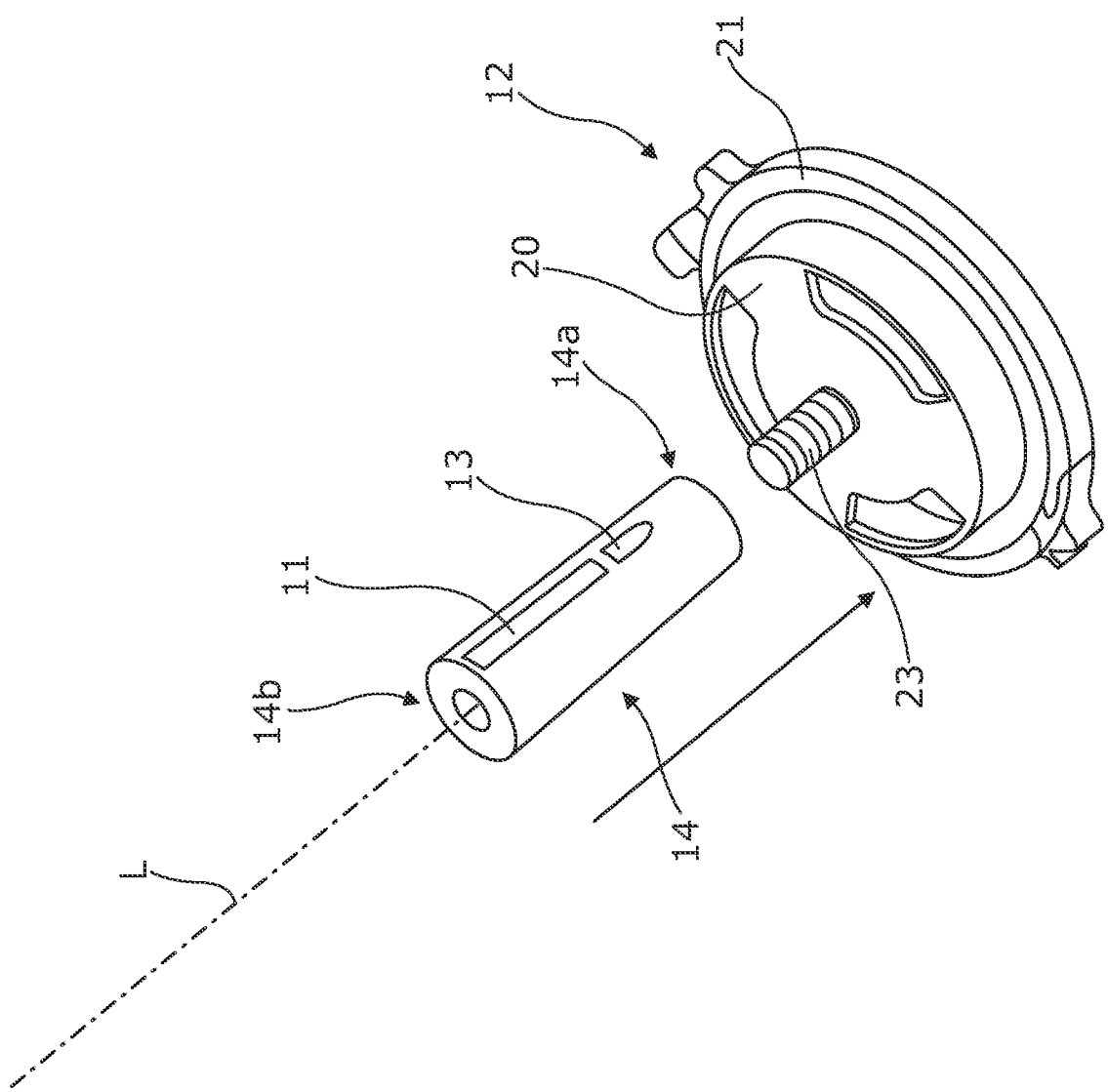
FIG. 2 is a depiction of the adjustment tool according to the invention for adjusting a maneuvering mechanism of a main landing gear of an aircraft.
Figure 2:
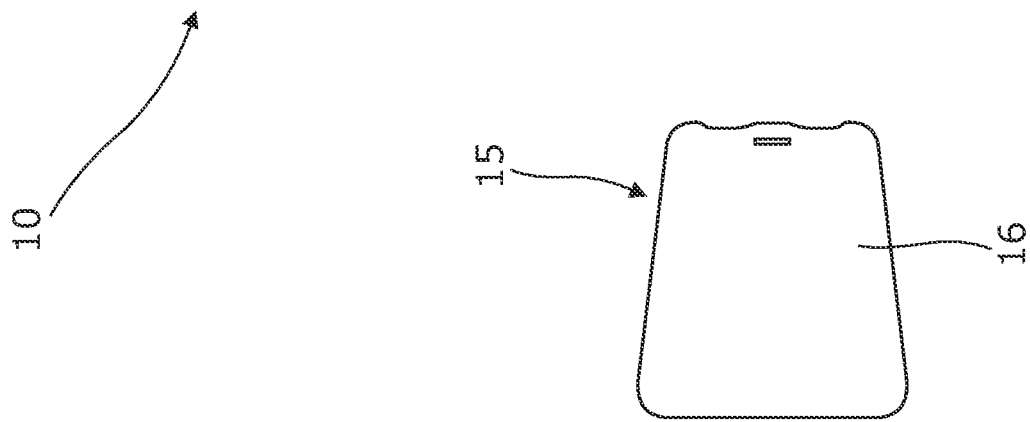
Figure 3:
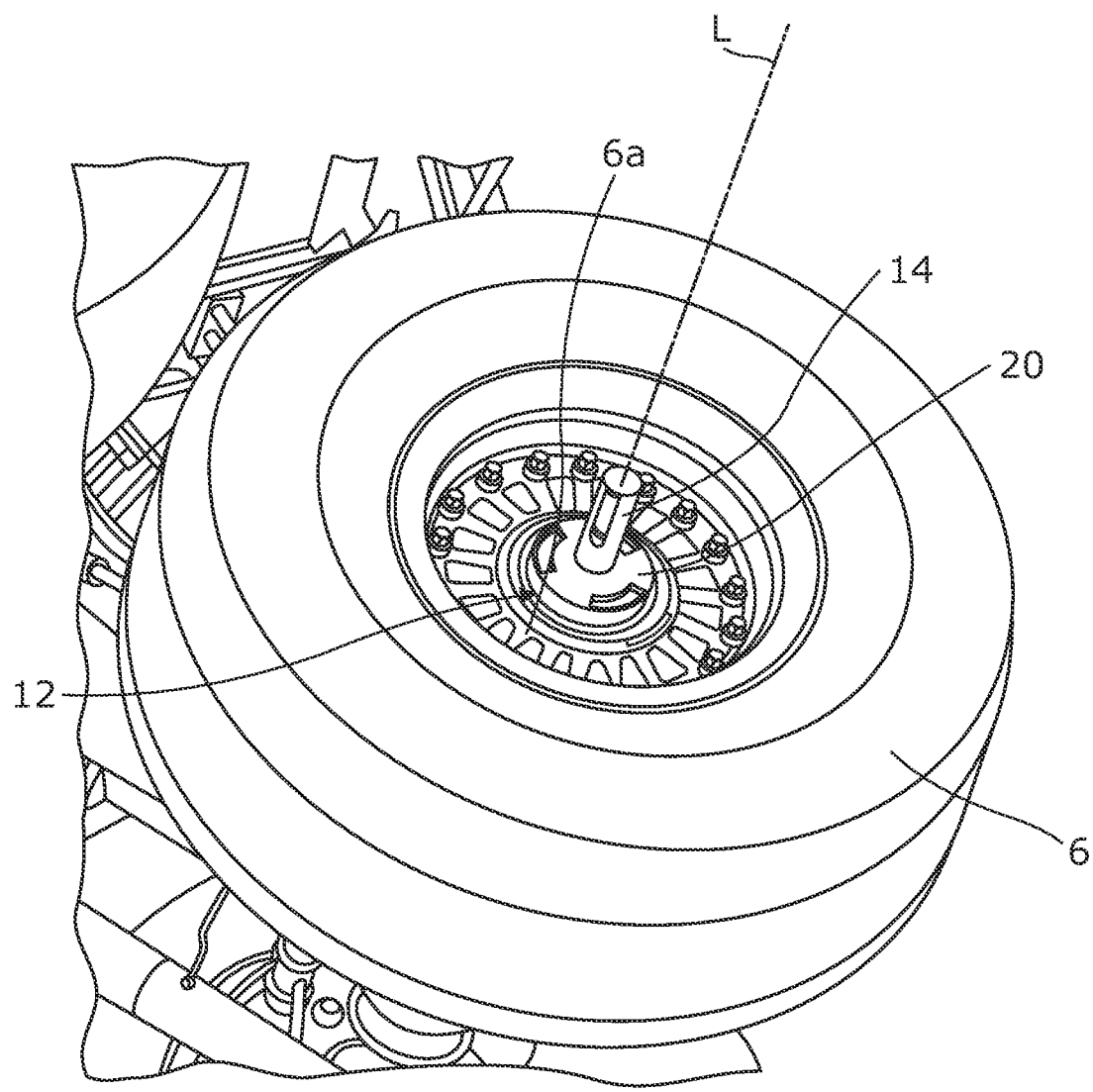
FIG. 3 is a view showing the tool in FIG. 2 fastened to the hub of a wheel of a main landing gear of an aircraft.

With reference to FIGS. 2 and 3, an adjustment tool 10 according to the invention for adjusting a maneuvering mechanism of a main landing gear comprises a telemeter 11, a locking system 12 for locking the telemeter on the external face of a wheel 6, a wireless communication unit 13 that is connected to the telemeter 11 and makes it possible, when the tool 10 is being used, to connect the telemeter 11 with a control device 15 provided with a display screen 16.

The telemeter 11 is, for example, a laser or ultrasonic telemeter.

In the embodiment of the invention that is illustrated in FIGS. 2 and 3, the telemeter 11 can be detached from its locking system 12 in order to make it easier to transport the tool 10 and the locking system 12 is designed to be mounted on the hub 6a of a wheel 6.

The locking system 12 for locking the telemeter comprises a shoe 20 and an attachment system 21 that is secured to the shoe so as to fasten the shoe 20 to the hub 6a.

The shoe 20 has the overall shape of a hollow cylinder with an inner diameter that is slightly larger than the outer diameter of the hub 6a and comprises an open face so that it can cover the hub 6a. The shoe 20 comprises a threaded rod 23 that is arranged on the flat and solid external face of the shoe 20 and extends along the axis of revolution of the shoe 20.

The attachment system 21, which is, for example, of clamping jaw or clamping collar type, is arranged at the open face of the shoe 20 and allows, when it is locked, the shoe 20 and the wheel 6 to be secured to one another.

The telemeter 11, the communication unit 13 and their electric power supply (not shown) are incorporated in a chassis 14. In the example in FIGS. 2 and 3, the chassis 14 has a cylindrical shape and comprises a tapped hole (not shown) that is made in a first end 14a of the chassis 14 and extends parallel to the longitudinal axis of the chassis. The threaded rod 23 of the shoe has a screw pitch complementary to the thread of the tapped hole, so as to allow the chassis 14 to be fastened to the shoe 20.

The optical elements of the telemeter 11, in the case in which the telemeter is a laser telemeter, or the electroacoustic transducing elements, in the case in which the telemeter 11 is an ultrasonic telemeter, are arranged at the second end 14b of the chassis 14. In operation, a laser beam emitted by the telemeter 11 is parallel to the longitudinal axis L of the chassis 14 if the telemeter 11 is a laser telemeter, or the main direction of emission of the ultrasound is parallel to the longitudinal axis L of the chassis 14 if the telemeter 11 is of ultrasonic type.

In operation, the tool 10 is placed in communication with the control device 15. A signal that is indicative of the distance measured by the telemeter 11 is transmitted, via the wireless communication unit 13, to the control device, and the distance measured is displayed on the display screen 16 of the control device 15.

The control device 15 is, for example as is illustrated in FIG. 2, a touchscreen tablet or a mobile telephone, provided with an application for interacting with the tool 10. The connection with the tool is, for example, of Bluetooth type or is established using a Wifi network.

The method for adjusting the maneuvering mechanism of a main landing gear by means of the tool 10 comprises implementing the following successive steps, from a position of the main landing gear that is between the extended position and the retracted position:
  a selection step during which a wheel 6 of the main landing gear is selected to receive the telemeter 11, the selected wheel 6 having to have its external face facing the top wall of the bay of the main landing gear when the latter is in the retracted position;
  a locking step during which the telemeter 11 is secured to the selected wheel by means of the locking system 12 for locking the telemeter 11;
  a start-up step, during which the telemeter 11 is activated and placed in communication with a control device 15 used by an operator located on the ground;
  a measurement step during which the main landing gear is moved towards its retracted position and measurements taken by the telemeter 11 are transmitted to the control device 15 and displayed on its control screen 16;
  an adjustment step, initiated when the distance measured during the measurement step is smaller than a predetermined value, during which the movement of the main landing gear is stopped and the operators adjust the maneuvering mechanism of the main landing gear so that this stop position corresponds to the retracted position of the landing gear.

The predetermined value is a value that corresponds to a space that is defined between the landing gear and the top wall of the landing gear bay and allows, when the landing gear is in the retracted position, the doors to be closed without the risk of contact with the landing gear.

The predetermined value is calculated by the operators, in particular depending on the dimensions of the landing gear and of the landing gear bay and on the thickness of the doors.

In the case in which the maneuvering mechanism is an actuator mechanism, the adjustment comprising, for example, adjusting the end-of-travel position of the actuators.

The adjustment tool 10 thus makes it possible to adjust the maneuvering mechanism of a main landing gear without it being necessary for an operator to be positioned in the landing gear bay.

In another embodiment of the invention that is not illustrated in the figures, the shoe comprises, in place of the threaded rod, a plain rod with a groove arranged on the flat and solid external face of the shoe and which extends along the axis of revolution of the shoe. The chassis that comprises the telemeter, the communication unit and their electric power supply (not shown) is cylindrical in shape and comprises a plain hole with a spring-loaded plunger system that cooperates with the groove of the plain rod so as to lock the chassis on the shoe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for adjusting a main landing gear of an aircraft by means of an adjustment tool for adjusting a maneuvering mechanism of a retractable main landing gear of an aircraft, the landing gear having a plurality of wheels, wherein the tool comprises:
  a telemeter,
  a locking system for locking the telemeter on the external face of one of said plurality of wheels, and
  a wireless communication unit connected to the telemeter and allowing, when the tool is being used, a connection of the telemeter with a control device provided with a display screen,
  the locking system for locking the telemeter comprising:
    a shoe,
    an attachment system that is secured to the shoe so as to, when it is locked, fasten the shoe to a hub of the wheel,
    wherein the shoe is shaped as a hollow cylinder with an inner diameter that is slightly larger than an outer diameter of the hub of the wheel, the shoe comprising an open face so that the shoe can cover the hub,
    the attachment system being arranged at the open face of the shoe,
  the telemeter and the communication unit being incorporated in a chassis, the chassis having a cylindrical shape,
  the landing gear comprising a strut that is fastened inside a landing gear bay and mounted so as to be able to pivot about a pivot axis that is parallel to the longitudinal axis of a fuselage of the aircraft, the strut bearing a plurality of wheels, the landing gear also comprising a maneuvering mechanism for moving the landing gear between an extended position in which the strut of the landing gear is substantially perpendicular to the longitudinal axis of the aircraft, and a retracted position in which the landing gear is entirely folded into the landing gear bay, the method comprising the following successive steps, which are implemented from a position of the main landing gear that is between the extended position and the retracted position:
    selecting a wheel of the main landing gear to receive the telemeter, the selected wheel having its external face facing a top wall of the bay of the main landing gear when the main landing gear is in the retracted position;

locking the telemeter to the selected wheel via the locking system for locking the telemeter;

activating the telemeter and placing the telemeter in communication with a control device used by an operator remote from the wheel;

taking measurements by the telemeter as the main landing gear moves towards the retracted position, and transmitting the measurements to the control device and displaying the measurements on a control screen;

adjusting the maneuvering mechanism of the main landing gear, initiated when a distance measured during the measurement step is smaller than a predetermined value, and the movement of the main landing gear is stopped, so that a position of stoppage corresponds to the retracted position of the landing gear.

\* \* \* \* \*